US011227023B2

(12) United States Patent
Banatwala et al.

(10) Patent No.: US 11,227,023 B2
(45) Date of Patent: *Jan. 18, 2022

(54) SEARCHING PEOPLE, CONTENT AND DOCUMENTS FROM ANOTHER PERSON'S SOCIAL PERSPECTIVE

(71) Applicant: International Business Machines Corporation, Armonk, NY (US)

(72) Inventors: Mustansir Banatwala, Hudson, NH (US); David A. Brooks, Arlington, MA (US); Miguel A. Estrada, Hollis, NH (US); Joseph A. Russo, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 112 days.

This patent is subject to a terminal disclaimer.

(21) Appl. No.: 16/740,238

(22) Filed: Jan. 10, 2020

(65) Prior Publication Data
US 2020/0151231 A1    May 14, 2020

Related U.S. Application Data

(63) Continuation of application No. 14/956,023, filed on Dec. 1, 2015, now Pat. No. 10,592,567.

(51) Int. Cl.
*G06F 16/9535* (2019.01)
*G06Q 50/00* (2012.01)

(52) U.S. Cl.
CPC ......... *G06F 16/9535* (2019.01); *G06Q 50/01* (2013.01)

(58) Field of Classification Search
CPC .................................................. G06F 16/9535
(Continued)

(56) References Cited

U.S. PATENT DOCUMENTS 7,979,411 B2   7/2011   Mattox, Jr. et al.
8,620,896 B2   12/2013  Soderstrom
(Continued)

OTHER PUBLICATIONS

List of IBM Patents or Patent Applications Treated as Related, Jan. 13, 2020, pp. 1-2.
(Continued)

*Primary Examiner* — James Trujillo
*Assistant Examiner* — Fariborz Khoshnoodi
(74) *Attorney, Agent, or Firm* — Robert A. Voigt, Jr.; Winstead PC

(57) ABSTRACT

A method, system and computer program product for performing a search from another individual's social perspective. A name or a portion of a name of an individual known by the user is received. A directory search is then performed pertaining to the individual known by the user. After the user identifies the known individual from the directory search results, a selection to perform a directory, content or document search from the known individual's social perspective is received. Such a search may be performed based on the social network of the known individual. In this manner, by performing such searches from the social perspective of the known individual, such as the individual who disclosed the name of the individual who the user would like to contact, the user will be more likely to identify the correct individual, content or document in a more efficient manner.

20 Claims, 8 Drawing Sheets

(58) Field of Classification Search
USPC .......................................................... 707/769
See application file for complete search history.

(56) References Cited

U.S. PATENT DOCUMENTS

| | | | |
|---|---|---|---|
| 2009/0063470 A1 | 3/2009 | Peled et al. | |
| 2009/0119173 A1 | 5/2009 | Parsons et al. | |
| 2010/0278453 A1 | 11/2010 | King | |
| 2011/0014897 A1 | 1/2011 | Finucan | |
| 2011/0119593 A1* | 5/2011 | Jacobson | G06Q 30/02 715/736 |
| 2011/0153553 A1 | 6/2011 | Klotz | |
| 2011/0320400 A1* | 12/2011 | Namini | G06F 16/21 707/610 |
| 2012/0102002 A1 | 4/2012 | Sathyanarayana et al. | |
| 2012/0229657 A1* | 9/2012 | Calman | G06Q 30/00 348/207.1 |
| 2012/0323877 A1* | 12/2012 | Ray | G06F 16/9535 707/706 |
| 2013/0218902 A1* | 8/2013 | Vendrow | G06F 16/9535 707/748 |
| 2016/0042069 A1* | 2/2016 | Lee-Goldman | G06F 40/295 707/706 |
| 2016/0162582 A1* | 6/2016 | Chatterjee | G06F 16/9535 707/706 |

OTHER PUBLICATIONS

Nachum, Gili, "Social People Finder API 5.0," http://www-10.lotus.com/ldd/lcwiki.nsf/xpAPIViewer.xsp?lookupName=IBM+Connections+5.0+API+Documentation#action=openDocument&res_title=People_Finder_API&content=apicontent, 2015, one page.

LinkedIn, "Your Network and Degrees of Connection: What does "your network" and "out of network" mean?" https://help.linkedin.com/app/answers/detail/a_id/110/~/your-network-and-degrees-of-connection, 2014, one page.

* cited by examiner

SEARCHING PEOPLE, CONTENT AND DOCUMENTS FROM ANOTHER PERSON'S SOCIAL PERSPECTIVE

TECHNICAL FIELD

The present invention relates generally to conducting searches, and more particularly to performing searches to identify people, content or documents from another person's social perspective.

BACKGROUND

Oftentimes, people perform keyword searches to identify individuals, such as those that work in a large organization. For example, a user may desire to contact an individual at an organization but does not know that person's contact information (e.g., e-mail address, phone number). Typically, the user will enter a name (e.g., last name or both the first and last name) or a portion of a name (e.g., first few letters of the person's last name) in a search field of the organization's online directory in hopes of locating the appropriate person. However, after the user enters the name or a portion of the name, the user may receive a listing of many results, such as all those individuals with the last name starting with the first few letters entered by the user in the search field for the last name. As a result, the user may not be able to identify the appropriate person.

Consequently, some searching systems provide inline photos or details for those individuals that match the information (e.g., last name) entered by the user in the search field. While it makes it easier for the user to identify the appropriate person, the user may not have knowledge of the appearance of that person. For example, the user may only have knowledge of a portion of the person's name, such as the first name of an individual that was provided to the user from someone else, such as a work colleague. Furthermore, the searching system may still generate many search results that the user has to review.

Some searching systems address such deficiencies by presenting results of those individuals in the user's social network. However, such a process will not be able to assist the user in situations where the person being searched is not in the user's social network.

As a result, there is not currently a means for efficiently allowing a user to search and identify the correct person when the user does not know or have a relationship with the person to be searched, including those outside of the user's social network.

SUMMARY

In one embodiment of the present invention, a method for performing a search from another individual's social perspective comprises receiving a portion of a name of an individual known by a user who works at a different organization than the user. The method further comprises generating directory search results comprising a listing of names based on the received portion of the name of the known individual. The method additionally comprises receiving a selection of a name from the listing of names from the directory search results by the user, where the selected name corresponds to the known individual. Furthermore, the method comprises receiving a selection to perform a content search from a social perspective of the known individual. Additionally, the method comprises receiving one or more search terms to conduct the content search from the known individual's social perspective, where the one or more search terms comprise a portion of a name of an individual who is unidentifiable by the user but is a member of a social network of the known individual. In addition, the method comprises performing the content search based on the known individual's social perspective using the received one or more search terms, where the user is looking for a document pertaining to a topic that the individual has acted upon but does not have knowledge as to where the document is stored, where the known individual has access to the document. The method further comprises generating content search results using the received one or more search terms from the known individual's social perspective thereby increasing the likelihood of generating correct search results for the user in a more efficient manner, where the content search results comprise the document pertaining to the topic that the individual acted upon.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for performing a search from another individual's social perspective. In one embodiment of the present invention, a name or a portion of a name of an individual known by the user is received. A directory search is then performed pertaining to the individual known by the user. After the user identifies the known individual from the directory search results, a selection to perform a directory, content or document search from the known individual's social perspective is received. Such a search may be performed from the known individual's social perspective. That is, the directory, content or document search is performed based on the social network of the known individual. After receiving the search term(s) to conduct a directory, content or document search from the known individual's social perspective, a directory, content or document search is performed based on the known individual's social perspective using the received search term(s). The results from such a directory, content or document search is then generated. In this manner, by performing such searches from the social perspective of the known individual, such as the individual who disclosed the name of the individual who the user would like to contact, the user will be more likely to identify the correct individual, content or document in a more efficient manner.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
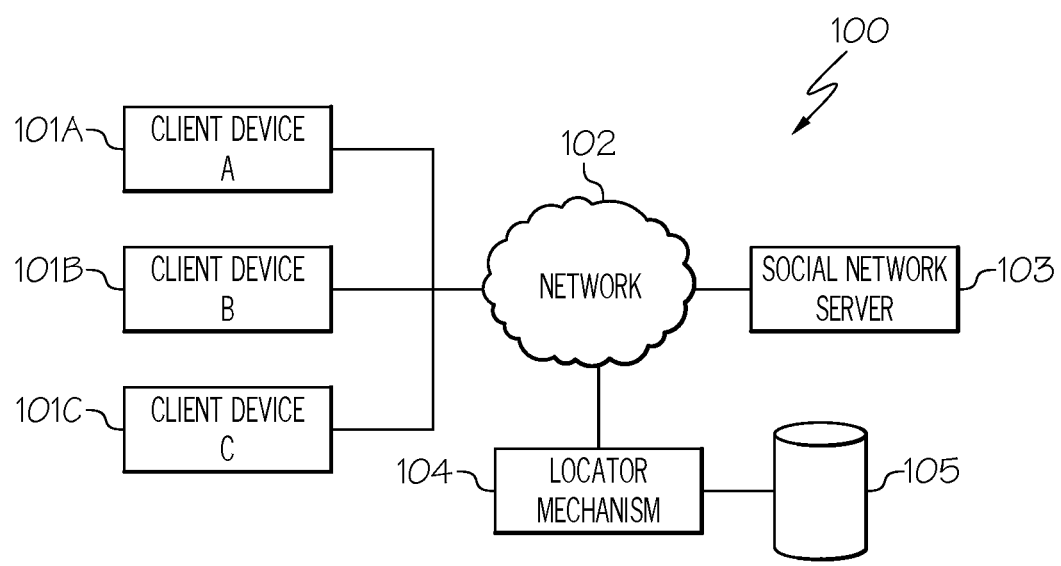
FIG. 1 illustrates a social network system configured in accordance with an embodiment of the present invention.

Referring now to the Figures in detail, FIG. 1 illustrates a social network system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. In one embodiment, one or more users (i.e., users of client devices 101) may be an employee of an organization who seeks to perform a directory, content or document search based on the social perspective of a known individual who works in the same organization as the users. In one embodiment, one or more users (i.e., users of client devices 101) may be an employee of an organization who seeks to perform a directory, content or document search based on the social perspective of the known individual who works at a different organization than the users. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 103 is connected to network 102 by wire or wirelessly. While FIG. 1 illustrates a single social network server 103, it is noted for clarity that multiple servers may be used to implement the social networking and/or microblogging service.

System 100 further includes a locator mechanism 104 connected to network 102 by wire or wirelessly. Locator mechanism 104 is configured to perform a directory, content or document search for a user of client device 101 from the social perspective of an individual known by the user as discussed in further detail below. A description of the hardware configuration of locator mechanism 104 is provided below in connection with FIG. 2.

System 100 additionally includes a database 105 configured to store directory, content and document information pertaining to individuals who may or may not work at the same organization as the user requesting a search. In one embodiment, locator mechanism 104 and database 105 are located within the same organization that employs the users of client devices 101.

System 100 is not to be limited in scope to any one particular network architecture. System 100 may include any number of client devices 101, networks 102, social network servers 103, locator mechanisms 104 and databases 105. Furthermore, in one embodiment, locator mechanism 104 may be part of client device 101 or social network server 103.

Figure 2:
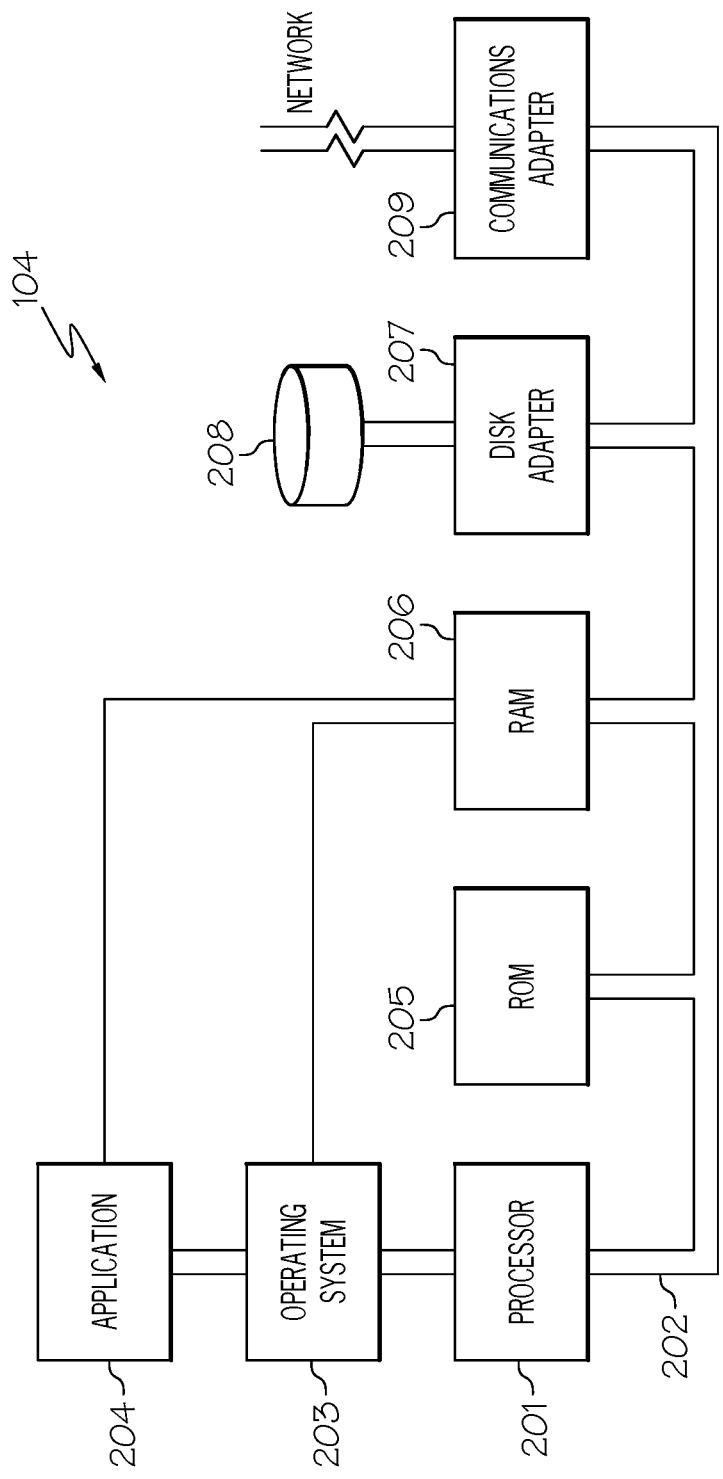
FIG. 2 illustrates a hardware configuration of a locator mechanism configured in accordance with an embodiment of the present invention.

Referring now to FIG. 2, FIG. 2 illustrates a hardware configuration of locator mechanism 104 (FIG. 1) which is representative of a hardware environment for practicing the present invention. Referring to FIG. 2, locator mechanism 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for performing a directory, content or document search for a user of client device 101 (FIG. 1) from the social perspective of an individual known by the user as discussed further below in association with FIGS. 3-8.

Referring again to FIG. 2, read-only memory ("ROM") 205 is coupled to system bus 202 and includes a basic input/output system ("BIOS") that controls certain basic functions of locator mechanism 104. Random access memory ("RAM") 206 and disk adapter 207 are also coupled to system bus 202. It should be noted that software components including operating system 203 and application 204 may be loaded into RAM 206, which may be locator mechanism's 104 main memory for execution. Disk adapter 207 may be an integrated drive electronics ("IDE") adapter that communicates with a disk unit 208, e.g., disk drive. It is noted that the program for performing a directory, content or document search for a user of client device 101 from the social perspective of an individual known by the user, as discussed further below in association with FIGS. 3-8, may reside in disk unit 208 or in application 204.

Locator mechanism 104 may further include a communications adapter 209 coupled to bus 202. Communications adapter 209 interconnects bus 202 with an outside network (e.g., network 102 of FIG. 1) thereby allowing locator mechanism 104 to communicate with client devices 101 and social network server 103.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, oftentimes, people perform keyword searches to identify individuals, such as those that work in a large organization. For example, a user may desire to contact an individual at an organization but does not know that person's contact information (e.g., e-mail address, phone number). Typically, the user will enter a name (e.g., last name or both the first and last name) or a portion of a name (e.g., first few letters of the person's last name) in a search field of the organization's online directory in hopes of locating the appropriate person. However, after the user enters the name or a portion of the name, the user may receive a listing of many results, such as all those individuals with the last name starting with the first few letters entered by the user in the search field for the last name. As a result, the user may not be able to identify the appropriate person. Consequently, some searching systems provide inline photos or details for those individuals that match the information (e.g., last name) entered by the user in the search field. While it makes it easier for the user to identify the appropriate person, the user may not have knowledge of the appearance of that person. For example, the user may only have knowledge of a portion of the person's name, such as the first name of an individual that was provided to the user from someone else, such as a work colleague. Furthermore, the searching system may still generate many search results that the user has to review. Some searching systems address such deficiencies by presenting results of those individuals in the user's social network. However, such a process will not be able to assist the user in situations where the person being searched is not in the user's social network. As a result, there is not currently a means for efficiently allowing a user to search and identify the correct person when the user does not know or have a relationship with the person to be searched, including those outside of the user's social network.

Figure 3:
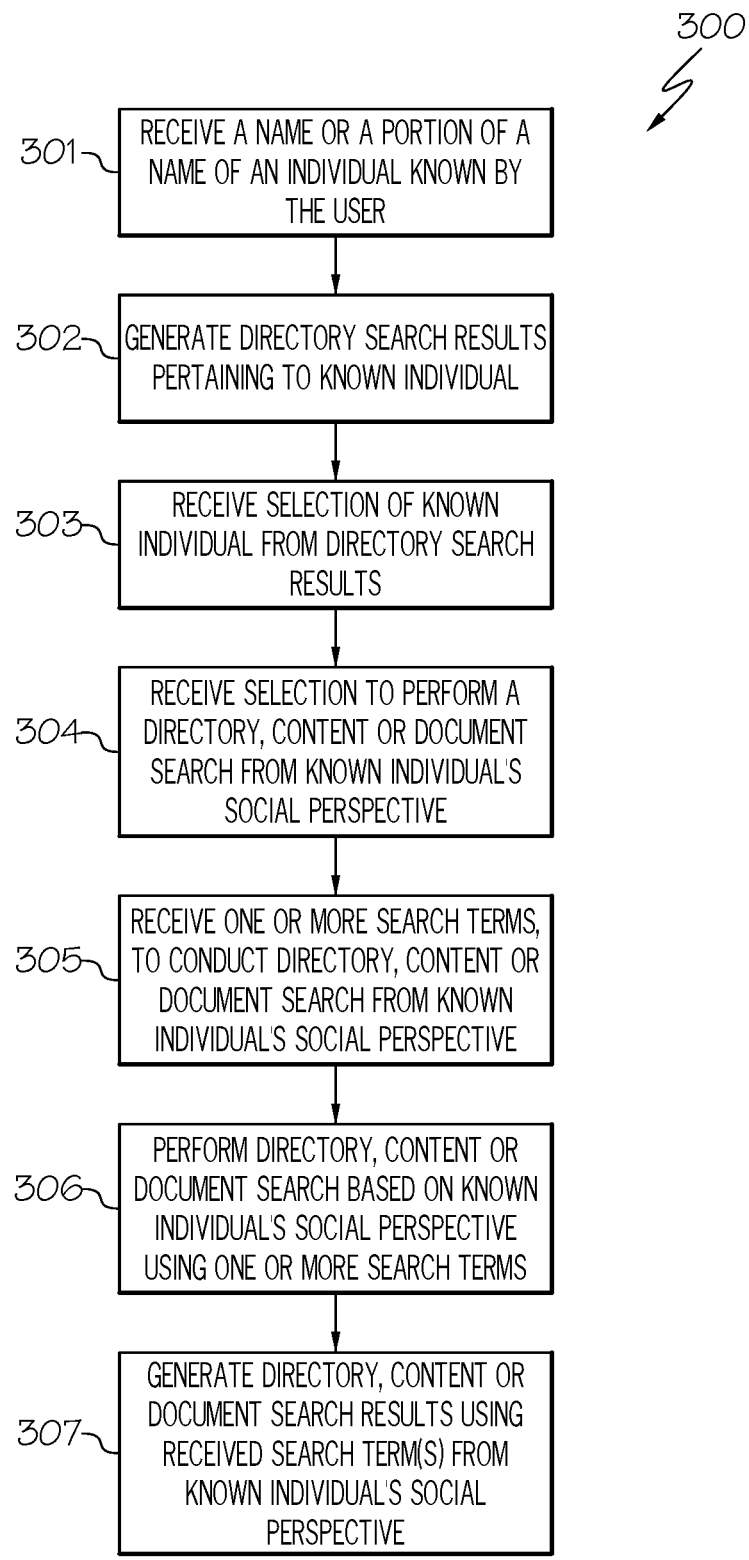
FIG. 3 is a flowchart of a method for performing a directory, content or document search from the social perspective of an individual known by the user in accordance with an embodiment of the present invention.
Figure 4:
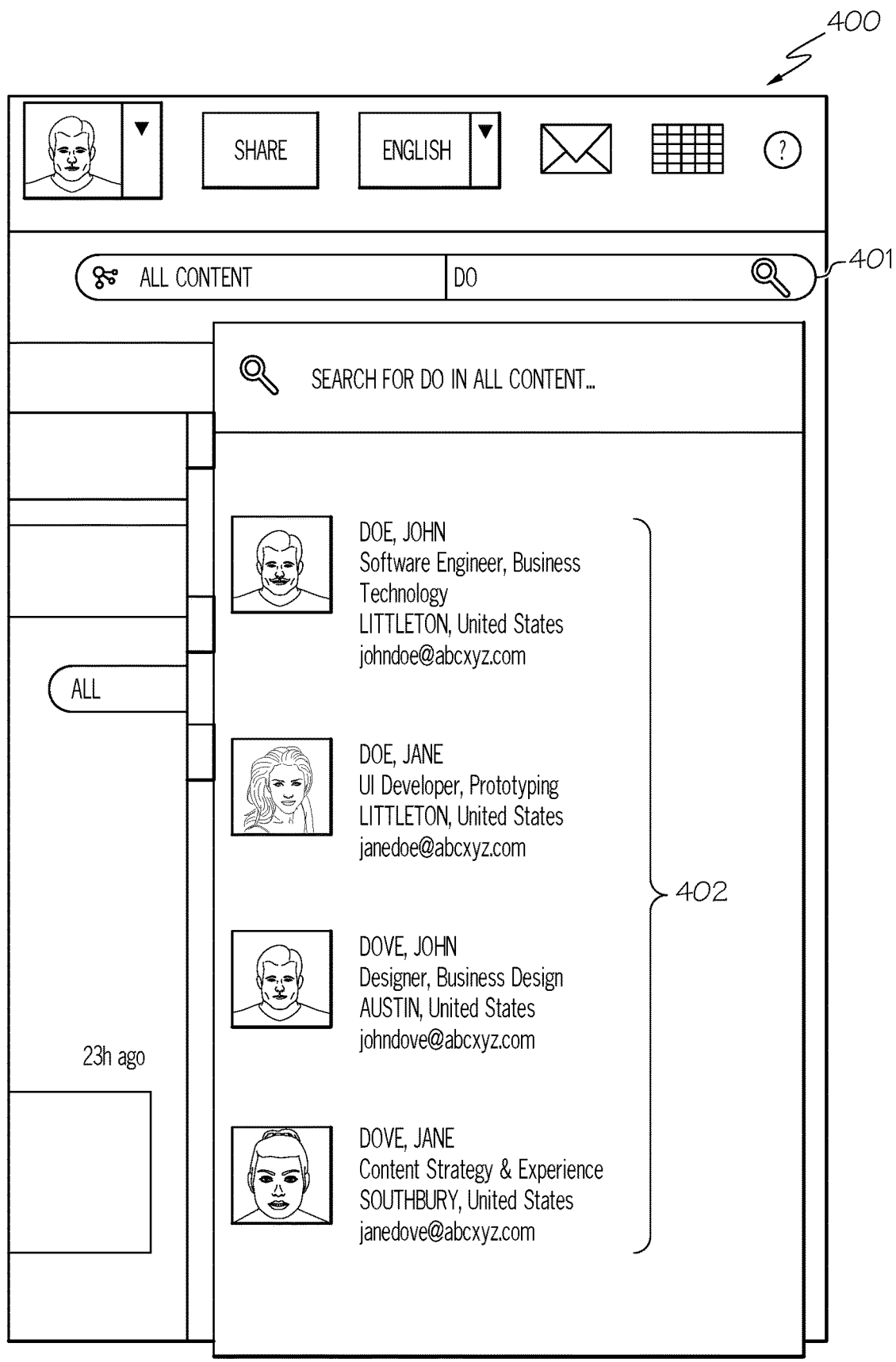
FIG. 4 illustrates performing a directory search for the individual known by the user in accordance with an embodiment of the present invention.
Figure 5:
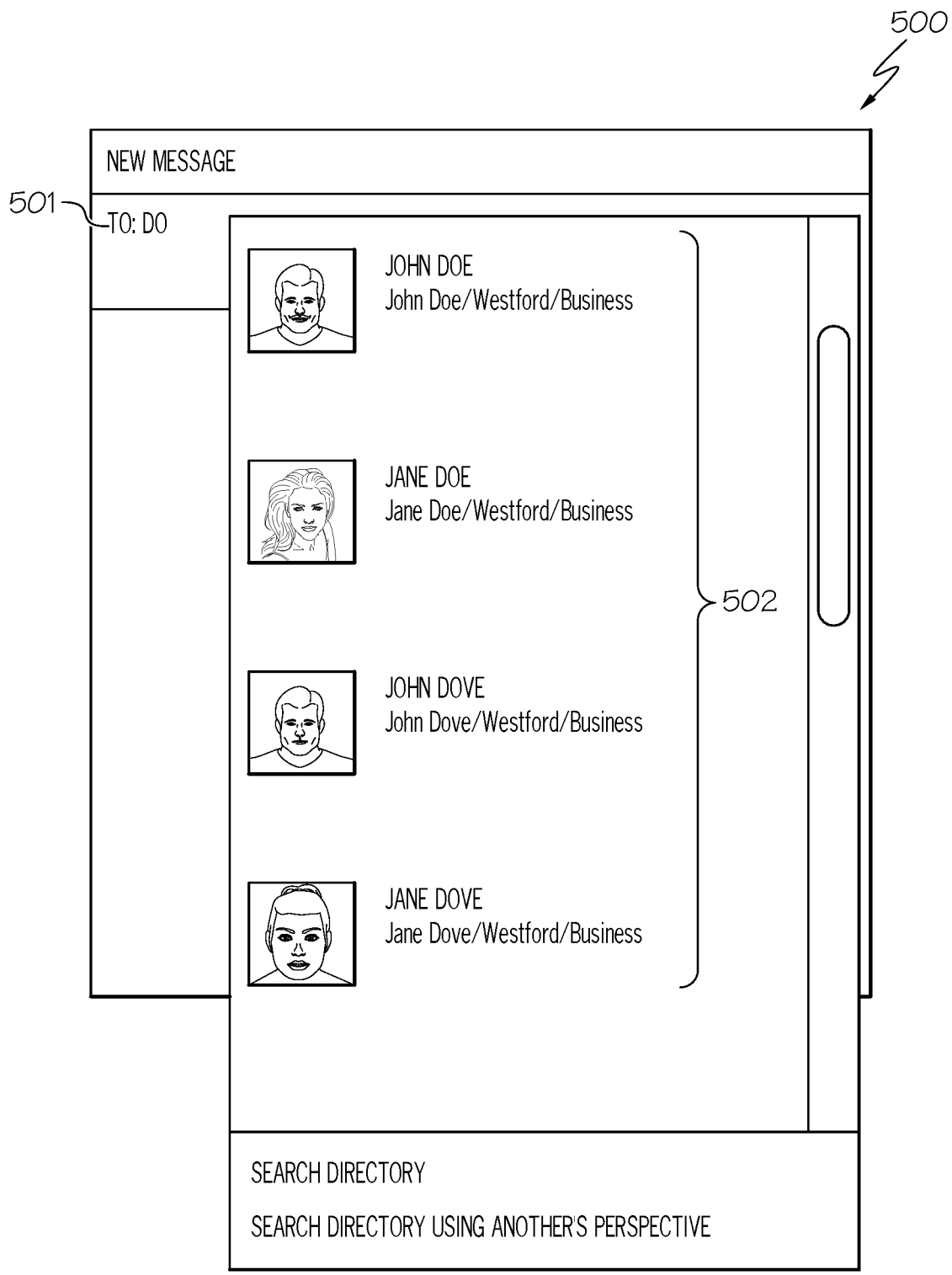
FIG. 5 illustrates another example of performing a directory search for the individual known by the user in accordance with an embodiment of the present invention.
Figure 6:
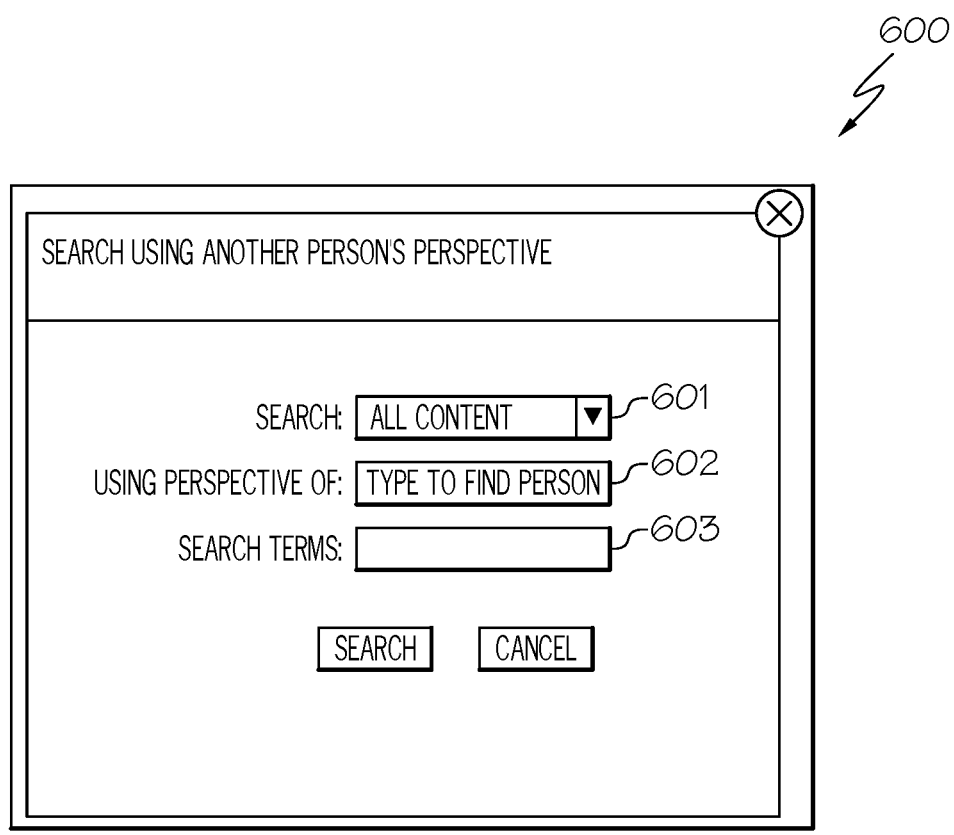
FIG. 6 illustrates a graphical user interface object allowing the user to select a type of search (e.g., content) to be performed from a selected individual's social perspective in accordance with an embodiment of the present invention.
Figure 7:
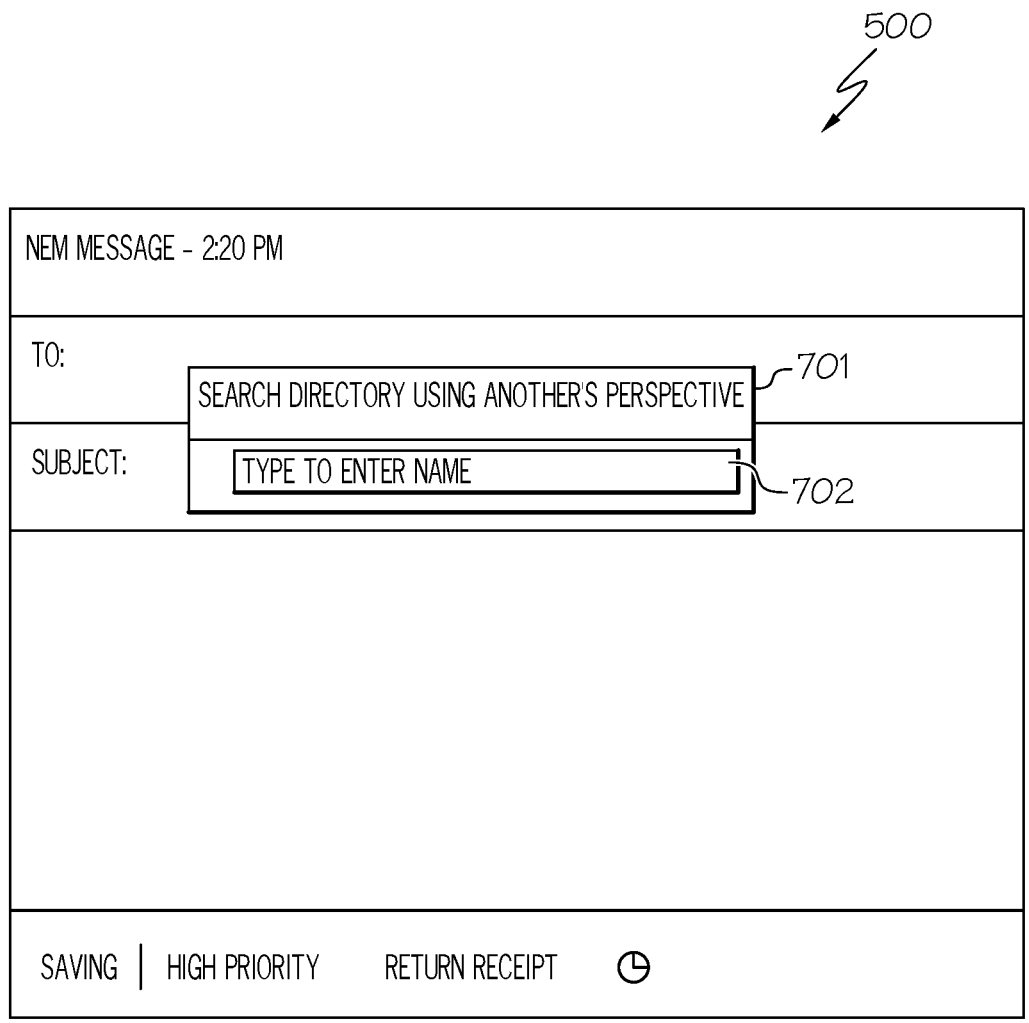
FIG. 7 illustrates an example of performing a search, such as a directory search, from the known individual's social perspective in accordance with an embodiment of the present invention.
Figure 8:
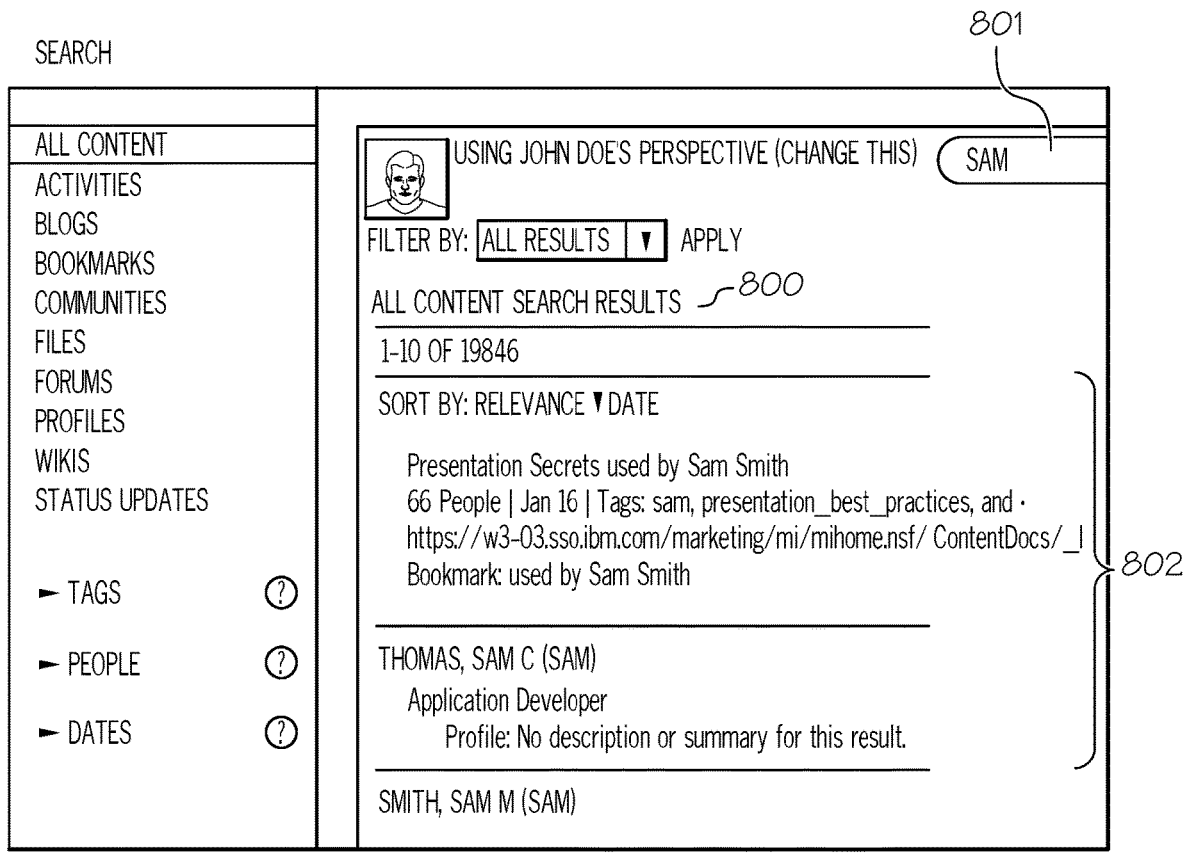
FIG. 8 illustrates a content search performed from the social perspective of the known individual in accordance with an embodiment of the present invention.

The principles of the present invention provide a means for efficiently allowing a user to perform a search, such as a directory search, to identify the correct person outside of the user's social network from the social perspective of an individual known by the user as discussed below in association with FIGS. 3-8. Furthermore, as discussed below, using the principles of the present invention, a content and document search may also be performed from the social perspective of an individual known by the user. FIG. 3 is a flowchart of a method for performing a directory, content or document search from the social perspective of an individual known by the user. FIG. 4 illustrates performing a directory search for the individual known by the user. FIG. 5 illustrates another example of performing a directory search for the individual known by the user. FIG. 6 illustrates a graphical user interface object allowing the user to select a type of search (e.g., content) to be performed from a selected individual's social perspective. FIG. 7 illustrates an example of performing a search, such as a directory search, from the known individual's social perspective. FIG. 8 illustrates a content search being performed from the social perspective of the known individual.

As stated above, FIG. 3 is a flowchart of a method 300 for performing a directory, content or document search from the social perspective of an individual known by the user (i.e., user of client device 101 of FIG. 1) in accordance with an embodiment of the present invention.

Referring to FIG. 3, in conjunction with FIGS. 1-2, in step 301, locator mechanism 104 receives a name or a portion of a name of an individual known by the user (i.e., user of client device 101).

In step 302, locator mechanism 104 generates directory search results pertaining to the individual known by the user.

For example, the user may be provided with a name, such as "Sam Smith," from "John Doe," who is known by the user. When the user needs to contact Sam Smith, the user performs a directory search but encounters a listing of over 200 names and is unsure as to which Sam Smith corresponds to the Sam Smith in question. Alternatively, the user may only remember a portion of the name (e.g., only remembers the last name of Smith) provided to him from John Doe. In such situations, the user may conduct a directory search by entering the name of John Doe, who is known by the user, in the search field as illustrated in FIG. 4. After identifying the entry for John Doe, the user will then perform a search for Smith from the social perspective of John Doe as discussed further below.

Referring to FIG. 4, FIG. 4 illustrates performing a directory search for the individual known by the user in accordance with an embodiment of the present invention. As illustrated in FIG. 4, the graphical user interface object 400 for performing a directory search includes a search field 401. As further illustrated in FIG. 4, the user enters a portion of the known individual's last name (e.g., "Do" for "Doe") in search field 401 and a listing 402 of individuals with the last name of "Do" appears (e.g., "Doe, John," "Doe, Jane," "Dove, John," and "Dove, Jane") to the user.

FIG. 5 illustrates another example of performing a directory search for the individual known by the user in accordance with an embodiment of the present invention. In this example, the user is performing a directory search for the individual known by the user in the context of composing a message 500. After the user enters a portion of the known individual's last name (e.g., "Do" for "Doe") in the To: field 501, a listing 502 of individuals with the last name of "Do" appears (e.g., "Doe, John," "Doe, Jane," "Dove, John," and "Dove, Jane") to the user.

Returning to FIG. 3, in conjunction with FIGS. 1-2 and 4-5, in step 303, locator mechanism 104 receives a selection of the known individual from the directory search results. For example, as illustrated in FIGS. 4 and 5, the user (i.e., user of client device 101) may select the entry corresponding to John Doe.

In step 304, locator mechanism 104 receives a selection to perform a directory, content or document search from the known individual's social perspective. In one embodiment, the person selected to have a search be performed from that person's social perspective may have an option to determine which, if any users, would be allowed to select him/her to have a search be conducted from that person's social perspective.

A directory search, as used herein, refers to a search for contact information (e.g., name, phone number, business location, role of employee, address, photograph, etc.) of individuals, such as in an organization, which may be stored in database 105. A content search, as used herein, refers to a search for textual, visual or aural content, such as profiles, videos, presentations, articles, etc., posted on the Intranet/Internet and/or stored in database 105. A document search, as used herein, refers to a search for documents, such as articles, publications, papers, that were posted on an organization's Intranet and/or posted on the Internet and/or stored in database 105.

In one embodiment, these searches are performed from the known individual's social perspective. That is, the directory, content or document search is performed based on the social network of the known individual. For example, the user may have received a name (referred to herein as the "unidentified individual") from the known individual but is unsure as to which entry corresponds to that individual based on a previous directory search. However, since the known individual provided the name of the unidentified individual to the user, the unidentified individual may likely be in the social network of the known individual. As a result, by searching from the known individual's social perspective, the unidentified individual may likely be identified in the directory search conducted from the social perspective of the known individual. Similarly, content and documents may be identified by searching for such content and documents from the social perspective of the known individual. For example, the user may be looking for a document pertaining a topic that someone else has recently acted upon (e.g., edited, commented, liked it) but does not have knowledge as to where that document is stored. Based on the topic of the document and/or the person who recently acted upon it (if the user had such knowledge), the user may assume that the known individual would have access to such a document since he/she may have recently held a meeting pertaining to such a topic and/or may have recently discussed such a document being acted upon by that individual. As a result, such content and documents may be obtained by locator mechanism 104 performing a search on the Intranet/Internet and/or database 105 from the social perspective of the known individual. In such a search, the content and documents that are accessible via the social network of the known individual are identified. For instance, such content and documents may be accessible via the social network of the known individual since the authors of such content and documents are members of the known individual's social network.

An example of the user selecting to perform a directory, content or document search from the known individual's social perspective is shown in FIGS. 6 and 7.

Referring to FIG. 6, FIG. 6 illustrates a graphical user interface object 600 allowing the user to select a type of search (e.g., content) to be performed from a selected user's social perspective in accordance with an embodiment of the present invention. As illustrated in FIG. 6, graphical user interface object 600 includes a search field 601 for the user to indicate the type of search (e.g., content) to be performed from the perspective (i.e., social perspective) of the individual entered in field 602. The individual entered in field 602 by the user corresponds to the individual known by the user. Furthermore, field 603 of object 600 is a field for the user to enter the search terms for the search to be conducted from the social perspective of the individual entered in field 602. In this manner, by performing a search (e.g., content, directory, document) from the known individual's social perspective, a more accurate search may be performed since the search is performed using more knowledge than known by the user.

FIG. 7 illustrates another example of performing a search, such as a directory search, from the known individual's social perspective in accordance with an embodiment of the present invention. As illustrated in FIG. 7, a graphical user interface object 701 of message 500 may be presented to the user to allow a search, such as a directory search, be performed from the known individual's social perspective. The known individual may be entered in field 702 of object 701.

Returning to FIG. 3, in conjunction with FIGS. 1-2 and 4-7, in step 305, locator mechanism 104 receives one or more search terms to conduct a directory, content or document search from the known individual's social perspective. For example, the user may provide the search term(s) to conduct a directory, content or document search in field 603 of graphical user interface object 600 of FIG. 6.

In step 306, locator mechanism 104 performs a directory, content or document search based on the known individual's social perspective using the received search term(s).

In step 307, locator mechanism 104 generates the directory, content or document search results using the received search term(s) from the known individual's social perspective as illustrated in FIG. 8.

FIG. 8 illustrates a content search 800 performed from the social perspective of the known individual in accordance with an embodiment of the present invention. Referring to FIG. 8, content search 800 includes a listing of content discovered using the name of "Sam" from "John Doe's" perspective. In this example, the user entered the name of "Sam" in search field 801 to be searched using John Doe's social perspective. For instance, the user may only recall John Doe mentioning Sam's first name that was provided to the user by John Doe. By performing a search for Sam from John Doe's social perspective, the likelihood of discovering the correct Sam greatly increases.

As further illustrated in FIG. 8, content search 800 includes a listing of 802 of contents involving individuals with "Sam" in their name that were discovered from John Doe's social perspective. Such contents may be links to articles, profiles, etc. posted on the Intranet/Internet and/or stored in database 105 for those individuals with the name of "Sam" (e.g., Sam Smith and Sam Thomas) that are in the social network of John Doe. By performing such searches from the social perspective of the known individual, such as the individual who disclosed the name of the individual who the user would like to contact, the user will be more likely to identify the correct individual in a more efficient manner.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for performing a search from another individual's social perspective, the method comprising:
   receiving, by a locator mechanism, a portion of a name of an individual known by a user who works at a different organization than said user from a computing device utilized by said user, wherein said computing device is connected to said locator mechanism via a network;
   generating, by said locator mechanism, directory search results comprising a listing of names based on said received portion of said name of said known individual;
   receiving, by said locator mechanism, a selection of a name from said listing of names from said directory search results from said computing device of said user, wherein said selected name corresponds to said known individual;

receiving, by said locator mechanism, a selection to perform a content search from a social perspective of said known individual from said computing device of said user;

receiving, by said locator mechanism, one or more search terms to conduct said content search from said known individual's social perspective from said computing device of said user, wherein said one or more search terms comprise a portion of a name of an individual who is unidentifiable by said user but is a member of a social network of said known individual;

performing, by said locator mechanism, said content search based on said known individual's social perspective using said received one or more search terms, wherein said user is looking for a document pertaining to a topic that said individual has acted upon but does not have knowledge as to where said document is stored, wherein said known individual has access to said document; and generating, by said locator mechanism, content search results using said received one or more search terms from said known individual's social perspective thereby increasing the likelihood of generating correct search results for said user in a more efficient manner, wherein said content search results comprise said document pertaining to said topic that said individual acted upon.

2. The method as recited in claim 1, wherein said content search is a search for textual, visual and aural content posted on the Internet and/or stored in a database, wherein said textual, visual and aural content comprises profiles, videos, presentations and articles.

3. The method as recited in claim 1, wherein said unidentified individual corresponds to a name of an individual provided to said user by said known individual.

4. The method as recited in claim 1, wherein said content search results comprise content accessible in said social network of said known individual.

5. The method as recited in claim 1, wherein said unidentified individual authored content to be searched from said known individual's social perspective.

6. The method as recited in claim 1, wherein said content search results comprise links to content posted on the Internet or an Intranet and/or stored in a database for those individuals with said portion of said name of said individual who is unidentifiable by said user that are in said social network of said known individual.

7. The method as recited in claim 1, wherein said portion of said name of said individual known by said user is received in connection with said user composing a message.

8. A computer program product for performing a search from another individual's perspective, the computer program product comprising one or more computer readable storage mediums having program code embodied therewith, the program code comprising the programming instructions for:

receiving, by a locator mechanism, a portion of a name of an individual known by a user who works at a different organization than said user from a computing device utilized by said user, wherein said computing device is connected to said locator mechanism via a network;

generating, by said locator mechanism, directory search results comprising a listing of names based on said received portion of said name of said known individual;

receiving, by said locator mechanism, a selection of a name from said listing of names from said directory search results from said computing device of said user, wherein said selected name corresponds to said known individual;

receiving, by said locator mechanism, a selection to perform a content search from a social perspective of said known individual from said computing device of said user;

receiving, by said locator mechanism, one or more search terms to conduct said content search from said known individual's social perspective from said computing device of said user, wherein said one or more search terms comprise a portion of a name of an individual who is unidentifiable by said user but is a member of a social network of said known individual;

performing, by said locator mechanism, said content search based on said known individual's social perspective using said received one or more search terms, wherein said user is looking for a document pertaining to a topic that said individual has acted upon but does not have knowledge as to where said document is stored, wherein said known individual has access to said document; and generating, by said locator mechanism, content search results using said received one or more search terms from said known individual's social perspective thereby increasing the likelihood of generating correct search results for said user in a more efficient manner, wherein said content search results comprise said document pertaining to said topic that said individual acted upon.

9. The computer program product as recited in claim 8, wherein said content search is a search for textual, visual and aural content posted on the Internet and/or stored in a database, wherein said textual, visual and aural content comprises profiles, videos, presentations and articles.

10. The computer program product as recited in claim 8, wherein said unidentified individual corresponds to a name of an individual provided to said user by said known individual.

11. The computer program product as recited in claim 8, wherein said content search results comprise content accessible in said social network of said known individual.

12. The computer program product as recited in claim 8, wherein said unidentified individual authored content to be searched from said known individual's social perspective.

13. The computer program product as recited in claim 8, wherein said content search results comprise links to content posted on the Internet or an Intranet and/or stored in a database for those individuals with said portion of said name of said individual who is unidentifiable by said user that are in said social network of said known individual.

14. The computer program product as recited in claim 8, wherein said portion of said name of said individual known by said user is received in connection with said user composing a message.

15. A system, comprising:

a memory for storing a computer program for performing a search from another individual's perspective; and a processor connected to said memory, wherein said processor is configured to execute the program instructions of the computer program comprising:

receiving a portion of a name of an individual known by a user who works at a different organization than said user from a computing device utilized by said user, wherein said computing device is connected to said system via a network;

generating directory search results comprising a listing of names based on said received portion of said name of said known individual;

receiving a selection of a name from said listing of names from said directory search results from said computing device of said user, wherein said selected name corresponds to said known individual;

receiving a selection to perform a content search from a social perspective of said known individual from said computing device of said user;

receiving one or more search terms to conduct said content search from said known individual's social perspective from said computing device of said user, wherein said one or more search terms comprise a portion of a name of an individual who is unidentifiable by said user but is a member of a social network of said known individual;

performing said content search based on said known individual's social perspective using said received one or more search terms, wherein said user is looking for a document pertaining to a topic that said individual has acted upon but does not have knowledge as to where said document is stored, wherein said known individual has access to said document; and generating content search results using said received one or more search terms from said known individual's social perspective thereby increasing the likelihood of generating correct search results for said user in a more efficient manner, wherein said content search results comprise said document pertaining to said topic that said individual acted upon.

16. The system as recited in claim 15, wherein said content search is a search for textual, visual and aural content posted on the Internet and/or stored in a database, wherein said textual, visual and aural content comprises profiles, videos, presentations and articles.

17. The system as recited in claim 15, wherein said unidentified individual corresponds to a name of an individual provided to said user by said known individual.

18. The system as recited in claim 15, wherein said content search results comprise content accessible in said social network of said known individual.

19. The system as recited in claim 15, wherein said unidentified individual authored content to be searched from said known individual's social perspective.

20. The system as recited in claim 15, wherein said content search results comprise links to content posted on the Internet or an Intranet and/or stored in a database for those individuals with said portion of said name of said individual who is unidentifiable by said user that are in said social network of said known individual.

* * * * *